United States Patent [19]

Kageyama et al.

[11] Patent Number: 5,777,639
[45] Date of Patent: Jul. 7, 1998

[54] INK-JET RECORDING METHOD AND APPARATUS USING A LIGHT-TONABLE RECORDING LIQUID

[75] Inventors: Tetsuto Kageyama, Koshigaya; Shigeru Yoshimura, Yokohama; Takayoshi Hanagata, Yamato; Nagao Hosono, Hachioji; Takashi Saito, Yokohama, all of Japan

[73] Assignee: Canon Kabushiki Kaisha, Tokyo, Japan

[21] Appl. No.: 326,344

[22] Filed: Oct. 20, 1994

Related U.S. Application Data

[63] Continuation of Ser. No. 912,172, Jul. 13, 1992, abandoned.

[30] Foreign Application Priority Data

Jul. 17, 1991 [JP] Japan ................. 3-176733

[51] Int. Cl.$^6$ ................................. B41J 2/205
[52] U.S. Cl. .................... 347/15; 347/95; 347/96; 347/224; 358/298
[58] Field of Search .................... 347/95, 96, 100, 347/101, 224, 15; 522/25; 400/10, 45; 358/298; 430/10, 45

[56] References Cited

U.S. PATENT DOCUMENTS

| | | | |
|---|---|---|---|
| 3,705,043 | 12/1972 | Zabiak | 106/20 |
| 4,258,367 | 3/1981 | Mansukhani | 346/1.1 |
| 4,303,924 | 12/1981 | Young, Jr. | 346/1.1 |
| 4,746,933 | 5/1988 | Asakura | 346/76 PH |
| 4,950,696 | 8/1990 | Palazotto et al. | 522/25 |
| 4,952,480 | 8/1990 | Yamaguchi et al. | 430/281 |
| 4,978,969 | 12/1990 | Chieng | 346/1.1 |
| 4,992,347 | 2/1991 | Hawkins et al. | 430/10 |
| 5,045,420 | 9/1991 | Hosono et al. | 430/45 |
| 5,045,697 | 9/1991 | Schneider | 347/224 |
| 5,643,356 | 7/1997 | Nohr et al. | 347/86 |
| 5,681,380 | 10/1997 | Nohr et al. | 347/96 |

FOREIGN PATENT DOCUMENTS

| | | | |
|---|---|---|---|
| 0238328 | 9/1987 | European Pat. Off. | |
| 3013377 | 9/1981 | Germany | 346/140 R |
| 0040577 | 4/1981 | Japan | 400/126 |
| 0109777 | 8/1981 | Japan | 400/126 |
| 209884 | 11/1984 | Japan | 347/95 |
| 255891 | 11/1986 | Japan | |
| 109645 | 5/1987 | Japan | 347/102 |
| 69684 | 3/1988 | Japan | 347/95 |
| 283957 | 11/1988 | Japan | 347/102 |

*Primary Examiner*—Valerie Lund
*Attorney, Agent, or Firm*—Fitzpatrick, Cella, Harper & Scinto

[57] ABSTRACT

An ink-jet recording method employs a light-tonable recording liquid capable of being toned by light radiation, the liquid preferably containing a recording agent having an absorption peak within a certain wavelength range, an ammonium salt of an organic boron, and a liquid medium. The hue or the density of a desired portion of the light-tonable recording liquid on a recording member is changed by radiating toning light onto that portion. The recording member may have colored portions of an image previously recorded with a light-tonable recording liquid or colored portions just formed in the current recording. Toning light is radiated onto a desired position of the recording region of the member while varying the intensity and/or the period of light radiation in accordance with an information signal. Thus, toning may provide various half-tones or may render the toned portion of the recording liquid colorless, thereby erasing the relevant colored portions. Selective erasure may be followed by re-recording on the same position of the recording region, thereby effecting correction. All-surface erasure allows the recording member to be reused.

21 Claims, 6 Drawing Sheets

400;5,777,639

INK-JET RECORDING METHOD AND APPARATUS USING A LIGHT-TONABLE RECORDING LIQUID

This application is a continuation of application Ser. No. 07/912,172 filed Jul. 13, 1992, now abandoned.

BACKGROUND OF THE INVENTION

1. Field of the Invention

The present invention relates to an ink-jet recording method capable of toning (including erasing) one or more colored (printed) portions on a record or a recording member. The present invention also relates to an ink-jet recording apparatus for carrying out such a method.

2. Related Background Art

Hitherto, an ink-jet recording method for recording (printing) by ejecting a recording liquid (ink) onto a recording member, such as paper, has provided various half-tones of a record (print) by, for example, employing either recording liquids of a plurality of different colors or a plurality of recording liquids capable of rendering different recording densities even with respect to one color. Alternatively, the amount of recording liquid droplets adhered has been controlled.

However, it is a cumbersome operation to prepare a plurality of recording liquids differing in color or recording density. Also, in order to control the ejecting of a plurality of recording liquids, a complicated control system is necessary.

When producing a record having a high printing duty, since a great amount of recording liquids is adhered to the recording member, it cannot, in general, be readily fixed. Sometimes, an additional process for the purpose of fixing, such as drying, is necessary.

Records obtained by an ink-jet recording method have been disposed of when they have data errors or recording defects, or after they have been used. For this purpose, such records have been shredded or otherwise disposed of, as necessary. When the records concern secret matters, in order to keep them secret, the records have been disposed of after being dissolved in a processing liquid, or they have been shredded and subjected to a regeneration process.

However, in recent years, as the use of office automation equipment has spread, a serious problem has arisen from increases in the amount of waste, such as used recording paper. Records obtained by ink-jet recording are not an exception, and have the same problem of waste disposal after they have been used, etc. If the records are to be disposed of by dissolving them in a processing liquid, it is essential to take measures against pollution. Although the records may be regenerated after disposal, the expenses for the regeneration may not be insubstantial.

When records obtained by ink-jet recording have to be corrected, the errors have been manually corrected mainly by using a correction paint. Such correction greatly deteriorates the appearance quality of the records.

SUMMARY OF THE INVENTION

The present invention has been made in view of the above-described problems of ink-jet recorded records.

An object of the present invention is to provide an ink-jet recording method and an apparatus for the same that is capable of toning (including erasing) colored (printed) portions of a record by radiating light onto the portions.

Another object of the present invention is to provide an ink-jet recording method and an apparatus for the same that is capable of erasing colored (printed) portion(s) even after recording thereon.

Still another object of the present invention is to provide an ink-jet recording method and an apparatus for the same that is capable of selectively erasing a desired part of a record, thus enabling the part to be corrected.

A further object of the present invention is to provide an ink-jet recording method and an apparatus for the same that is capable of improving the ability of a record of being fixed even when a great amount of recording liquid is adhered to the recording member, such as when a record having a high printing duty is being produced.

According to the present invention, there is an ink-jet recording method for recording by ejecting a recording liquid onto a recording member, the method comprising the step of: employing as the recording liquid a light-tonable recording liquid capable of being toned by light radiation.

The present invention provides another ink-jet recording method, the method comprising the steps of: recording by ejecting a light-tonable recording liquid onto a recording member, thereby forming one or more colored portions on the recording member; and toning by radiating light onto a desired part of the colored portions.

The present invention provides a further ink-jet recording method, the method comprising the steps of: radiating light onto a desired part of one or more colored portions of an image recorded with a light-tonable recording liquid, thereby erasing the part; and recording again on the erased part by ejecting a recording liquid thereon.

According to the present invention, there is an ink-jet recording apparatus comprising: a recording head for ejecting, in accordance with recording information, droplets of a light-tonable recording liquid capable of being toned by light radiation; a recording head position control device for positioning the recording head at a recording position in accordance with the recording information; a recording member feed device for feeding the recording region of a recording member to the recording position; a recording member removal device for removing the recording member from the recording position; and a toning light radiation device for radiating light for toning the light-tonable recording liquid on the recording member.

DETAILED DESCRIPTION OF THE PREFERRED EMBODIMENTS

Figure 1:
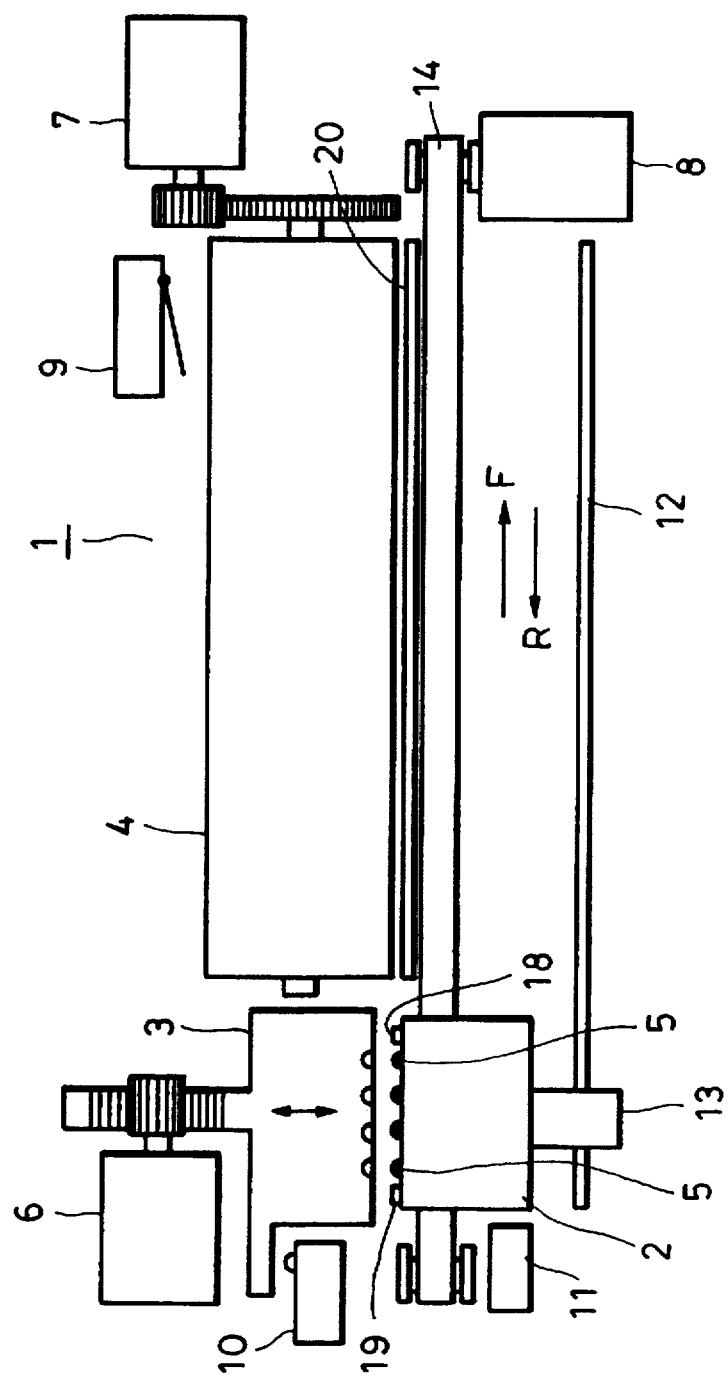
FIG. 1 is a view schematically showing the essential parts of the mechanical system of a first embodiment of an ink-jet recording apparatus according to the present invention.

In the present invention, the term "toning" means changing the hue and the density of a desired portion of the recording liquid per se or a desired part of the colored portion or portions formed on the recording medium or member with the recording liquid. Toning according to the present invention includes rendering colorless either that portion of the recording liquid or that part of the colored portions, whereby the relevant colored portions are erased.

According to the present invention, toning light is radiated for the purpose of toning. When toning light is radiated onto colored portions, various half-tones can be created in a record, thereby making it possible to obtain a high-quality record.

When toning light is radiated onto colored portions of a record which have become unnecessary, and thus erasing the unnecessary colored portions, it is possible to reuse the recording member, thereby making it possible to conserve resources and reduce the amount of recording paper waste.

If the radiation of toning light results in heat being generated or supplied, the heat can be utilized to promote the fixing of records.

When one or more selected colored portions are erased by radiating toning light, it is possible to correct an error or defect of a record without deteriorating its appearance quality, thereby making it possible to obtain a high-quality record. Further, the correction saves the recording member, thereby serving to reduce the consumption of resources and reduce the amount of recording paper waste.

The present invention employs a light-tonable recording liquid capable of being toned by radiation of toning light. The light-tonable recording liquid contains a light-tonable recording agent, the hue and/or the recording density of which can be changed by radiating toning light, and a liquid medium such as water or a medium mainly comprising water. Examples which may be used as the light-tonable recording agent include various dyes, such as the near-infrared absorbing coloring agent IR820B (trade name), which can be toned by radiating near-infrared light while an ammonium salt of organic boron coexists. When using such dyes, the recording liquid also contains an organic boron compound which coexists to provide counter ions.

In the case of the near-infrared absorbing coloring agent IR820B, a compound expressed by the following formula (I), it has an absorption peak at 825 nm, and can be toned by absorbing near-infrared light under the coexistence of an ammonium salt of organic boron, such as tetrabutylammonium butyltriphenyl borate. This toning is considered to result from the following reaction: The absorption of near-infrared light causes radicals to be generated, causing changes in the structure of the coloring agent, whereby its structure as a coloring agent is destructed. Finally, the substance stops absorbing light, and becomes colorless. This reaction is irreversible. Further, this is not a particular reaction of the coloring agent IR820B but is a phenomenon that can occur to a borate of any ordinary cationic dye if an ammonium salt of organic boron coexists.

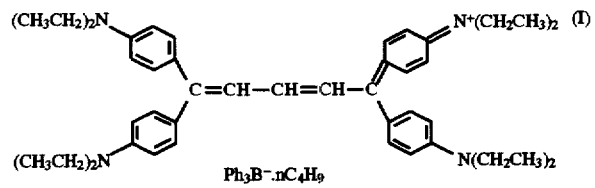

Examples of light-tonable recording liquids which may be used in the present invention include a recording liquid containing, in a chemical composition suitable for the intended use, a light-tonable recording agent having an absorption peak at a wavelength of 700 to 1000 nm (such as the above-described IR820B, or a borate of a cationic dye such as C.I. 11085, C.I. 11270, C.I. 21000, C.I. 41000, C.I. 42000, C.I. 42025, C.I. 42040, C.I. 42140, C.I. 42535, C.I. 42555, C.I. 42595, C.I. 44045, C.I. 45160, C.I. 45170, C.I. 45175, C.I. 48013, C.I. 48015, C.I. 48020, C.I. 48035, C.I. 48040, C.I. 48055, C.I. 48070, C.I. 49005, C.I. 50240, C.I. 51004 or C.I. 52015), an ammonium salt of organic boron, and a liquid medium. Examples which may be used as the liquid medium include water, and mixtures of water with various organic solvents. The concentration of the recording agent contained in the recording liquid is appropriately selected in accordance with the desired recording density, and may range, for example, from approximately 1 to 10 weight %, preferably 2 to 4 weight %. When an organic solvent is used, it may be used within a range, for example, from approximately 5 to 50 weight %.

An example which may be used as the ammonium salt of organic boron coexisting in the recording liquid, is tetrabutyl triphenyl borate. The concentration of the ammonium salt of organic boron approximately ranges from 1 to 100% of the weight % of the dye. The concentration of the ammonium salt of organic boron approximately ranges from 0.01 to 10% of the weight % of the recording liquid.

Examples of the organic solvent which may be used in the recording liquid include the following: an alcohol having a carbon number of 1 to 4, such as methyl alcohol, ethyl alcohol, n-propyl alcohol, isopropyl alcohol, n-butyl alcohol, sec-butyl alcohol, tert-butyl alcohol or isobutyl alcohol; an amide, such as dimethylformamide or dimethylacetamide; a ketone or ketone alcohol, such as acetone or diacetone alcohol; an ether, such as tetrahydrofuran or dioxane; a polyalkylene glycol, such as polyethylene glycol or polypropylene glycol; an alkylene glycol whose alkylene group contains 2 to 6 carbon atoms, such as ethylene glycol, propylene glycol, 1,2,6,-hexanetriol, thioglycol, hexylene glycol or diethylene glycol; glycerin; and a lower alkyl ether of a poly-alcohol, such as ethylene glycol methyl ether, diethylene glycol methyl (or ethyl) ether or triethylene glycol mono-methyl (or -ethyl) ether.

The recording liquid may additionally contain various additives, such as the following, as needed: a viscosity modifier, such as a polyvinyl alcohol, a cellulose or a water-soluble resin; a solubilizer of a nitrogen-containing heterocyclic ketone or the like, such as N-methyl-2-pyrrolidone or 1,3-dimethyl-2-imidazolidinon; a surface active agent of various types; a surface tension adjusting agent, such as diethanolamine or triethanolamine; and a pH adjusting agent of a buffer solution or the like.

The toning light used to tone the light-tonable recording liquid is suitably selected in accordance with the type of the recording agent contained in the recording liquid. If a recording agent of the above-described type which is capable of being toned by radiating near-infrared light, is used, it is possible to use a laser beam of various types of a wavelength of 825 nm.

Embodiments:

Embodiments of the present invention will now be specifically described with reference to the drawings. The embodiments concern an example in which the present invention is applied to a serial printer.

Figure 2:
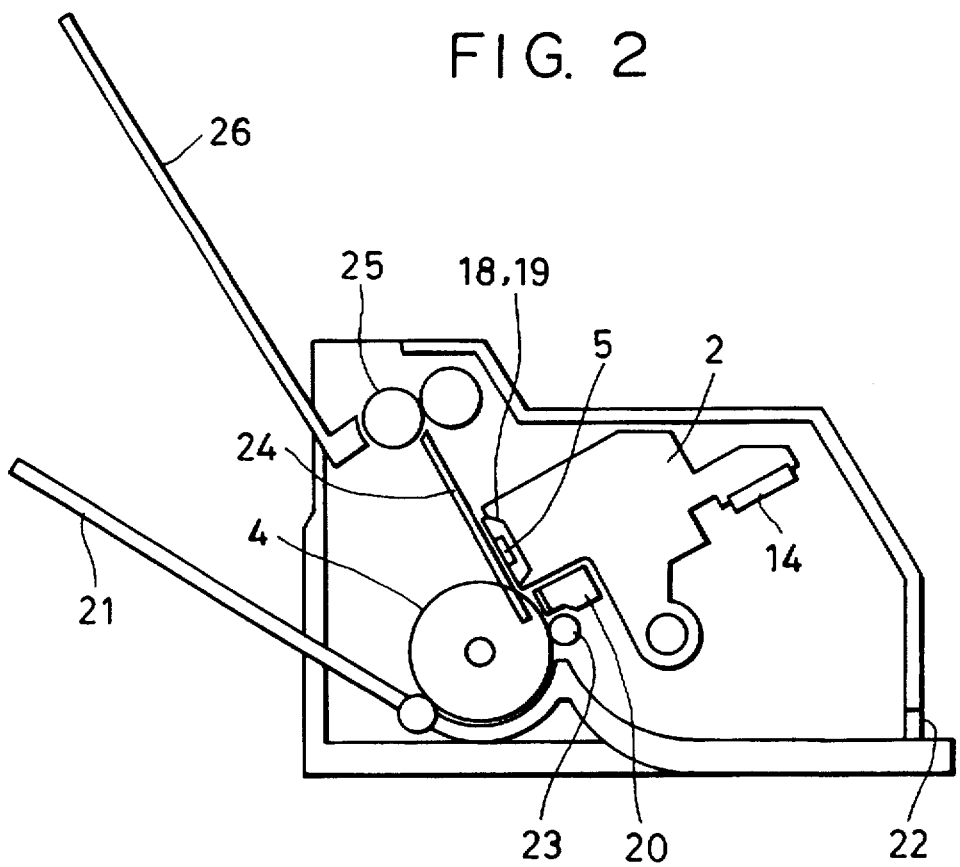
FIG. 2 is a side view of the essential parts of the recording apparatus shown in FIG. 1.

FIG. 1 is a plan view schematically showing the essential parts of the mechanical system of an ink-jet recording apparatus according to a first embodiment of the present invention. The ink-jet recording apparatus 1 includes a recording head 2 fixed to a carriage (not shown) which is in turn mounted on a guide bar (not shown) in such a manner as to be slidable along a platen 4 in the forward and reverse directions indicated by arrows F and R in FIG. 1. The recording head 2, as well as the carriage, is driven through a belt 14 by a carriage motor 8 consisting of a DC motor to reciprocatingly move in the directions F and R (scanning directions). The recording head 2 may employ various ejection methods, such as a method in which heat energy is used to form droplets of a recording liquid. The apparatus 1 also includes, as shown in FIG. 2, which is a side view of the essential parts thereof, a paper feed tray 21, a paper feed opening 22 at a front surface position (the tray 21 or the opening 22 being used to insert a recording member such as recording paper into the apparatus), and a feed roller 23 rotatable while in press-contact with the platen 4 to feed the recording member. Means for discharging a recording member from the interior of the apparatus comprises a stationary platen 24, a discharge roller 25, and a paper rest tray 26 on which a discharged recording member rests. The above-described constituents 21 to 26 together constitute a paper feed/discharge passageway along which a recording member is conveyed through the interior of the apparatus 1.

A toning light generating source 20, employing a laser, constitutes a first toning light radiation means for erasing a desired part of colored portions on a record produced employing a light-tonable recording liquid, such as that described above. The toning light generating source 20 (hereinafter abbreviated to "toning light source" unless otherwise specified) is provided at a position which is, in the direction in which a recording member is fed, upstream of the scanning position of the recording head 2 at which the head scans the surface of a recording member.

Figure 3:
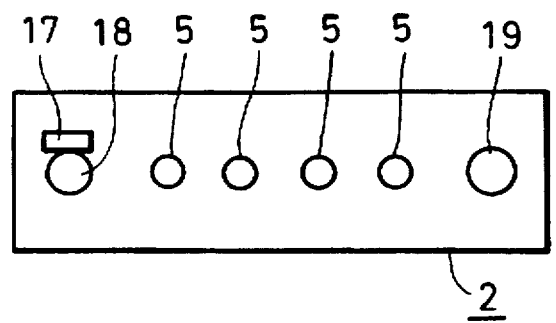
FIG. 3 is an enlarged front view of a recording head of the recording apparatus shown in FIG. 1, showing the surface of the head on which a photo-sensor is arranged and ejection holes are arranged in an array.

FIG. 3 shows, in a front view, the surface of the recording head 2 on which a plurality of ejection holes 5 for ejecting a recording liquid onto a recording member are arranged, these holes together constituting an ejection port of the recording head 2. The ejection holes 5 are arranged in a straight line, forming an ejection hole array. At either end of this array, toning light generating sources 18 and 19, each employing a laser, are provided as second toning light radiation means, the first and second toning light radiation means constituting the toning light radiation means according to the present invention. The toning light generating sources 18 and 19 (hereinafter abbreviated to "toning light sources" unless otherwise specified) are disposed in line with the ejection hole array. The toning light source 18 is at a position at which the source 18 leads when the recording head 2 moves in the direction F, while the toning light source 19 is at a position at which the source 19 leads when the head 2 moves in the direction R. The direction of propagation of toning light from the sources 18 and 19 is controlled by a control signal, as will be described later, so that toning light can be radiated onto a particular position of the recording member on the platen 4. As shown in FIG. 2, a photo-sensor 17 is disposed beside the toning light source 18.

As shown in FIG. 1, other features of the mechanical system of the recording apparatus 1 include a cap 3 driven by a cap motor 6 to move to and away from the recording head 2 in order to absorb recording liquid remaining on the head 2, and thus to allow the ejection holes 5 to recover from recording liquid ejection failure. The position of the movable cap 3 is detected by a cap sensor 10. The platen 4 has a black surface for supporting a recording member, and rotates when driven by a line feed motor 7 consisting of a stepping motor, so as to feed the recording member. A paper sensor 9 of a mechanical type detects whether or not there is a recording member on the platen 4. A home position sensor 11 is provided to sense a home position which serves as a reference position when detecting the position of the recording head 2. A linear encoder 12 and an encoder sensor 13 cooperate to sense the position of the recording head 2 when it is moving.

Figure 4:
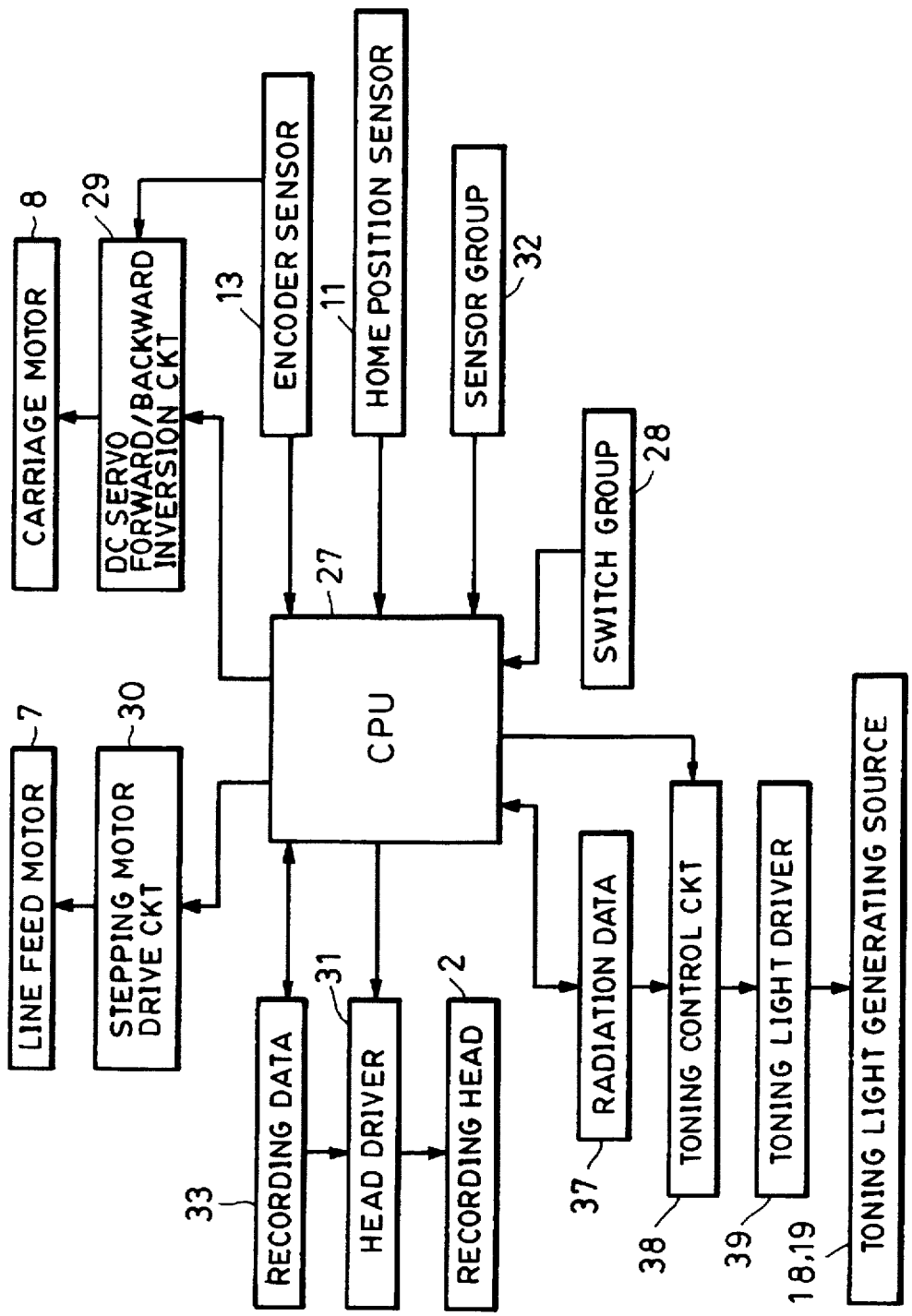
FIG. 4 is a block diagram showing the control system of the recording apparatus shown in FIG. 1.
Figure 5:
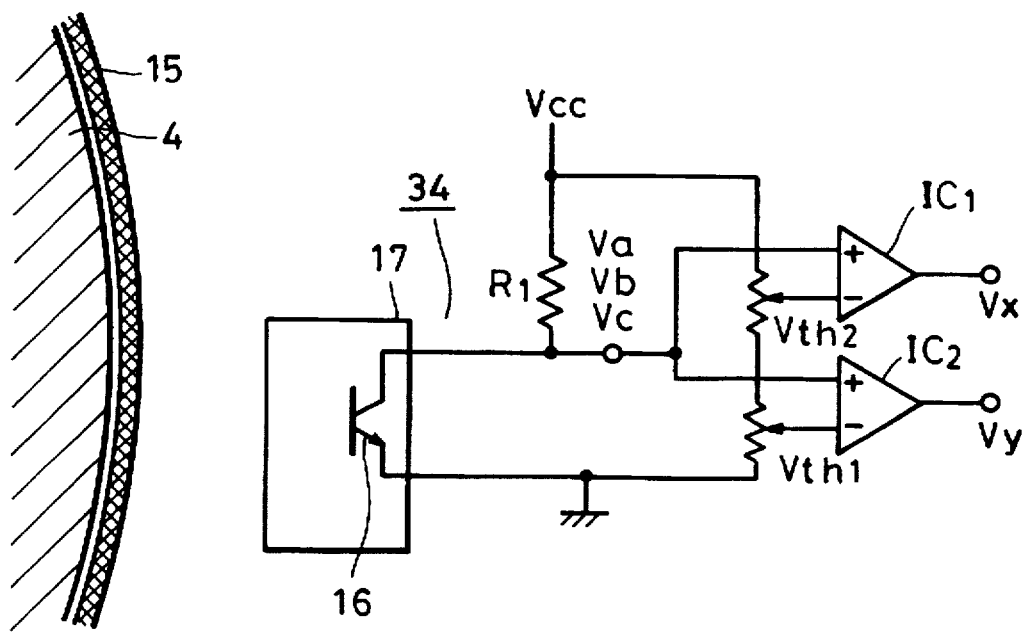
FIG. 5 is a circuit diagram showing a reflected light sensing circuit including the photo-sensor shown in FIG. 3.

FIG. 4 shows the control system of the apparatus shown in FIG. 1. A central processing unit 27 (CPU) controls in accordance with various operation inputs supplied through a group of switches 28 provided on a control panel, not shown. Specifically, the CPU 27 drives, with reference to inputs from the encoder sensor 13 and the home position sensor 11, the carriage motor 8 through a DC servo forward/backward inversion circuit (CKT) 29, and controls the direction and the speed of movement of the recording head 2. Also, the CPU 27 drives and controls the line feed motor 7 through a stepping motor drive circuit 30. Further, the CPU 27 supplies a head driver 31 with a recording signal indicating recording data 33 (comprising various items, as will be described later) transferred from an external control apparatus such as a computer, so that droplets of a recording liquid are ejected from the recording head 2 to the recording region of a recording member in accordance with the recording data 33. The control system effects a drop-on-demand type of control in which whether to or not to eject recording liquid droplets is determined with regard to each droplet. Inputs from a group of other sensors 32 are used to control other mechanisms, not shown.

The CPU 27 also controls in the following manner. When receiving an item of the recording data 33 concerning the size of a given recording member, the CPU 27 determines, on the basis of this item of data, the location of the recording region of the recording member. Further, the CPU 27 inputs data on the position of the recording head 2 detected by the home position sensor 11 and the linear encoder sensor 13. When the CPU 27 determines, from the determined location and the detected position, that the toning light sources 18 and 19 are positioned over the recording region, the CPU 27 causes, in accordance with radiation data 37, a toning control circuit 38 to control the luminous intensity and/or the period of radiation of toning light, so that a toning light driver 39 is able to cause toning light to be radiated accordingly from the toning light source 18 and/or 19.

The operation of the first embodiment will be described. A recording operation starts when necessary switches in the switch group 28 are operated. A recording member is fed from either the paper feed tray 21 or the paper feed opening 22 to the paper feeding side of the platen 4 by either the rotation of the platen 4 or a manual feed operation. When the paper sensor 9 detects that the recording member has arrived in the paper feeding side of the platen 4, the line feed motor 7 provides a stepping action to cause the platen 4 to rotate with the feed roller 23 following the rotation until the recording member is set at a recording start position. Subsequently, the carriage motor 8 causes forward or reverse movement of the recording head 2 while controlling the speed of the movement. During this operation, the photo-sensor 17 receives reflected light from the recording member, whereupon it is confirmed that the recording member has been fed to the correct position on the platen 4.

In synchronization with the driving by the carriage motor 8, the line feed motor 7 causes the recording member to be fed line by line. At this time, a signal corresponding to the recording data 33 is applied from the head driver 31 to the recording head 2 reciprocating in the scanning direction, so that recording liquid droplets are accordingly ejected from the ejection port of the recording head 2 to record characters and/or images. After the recording, the recording member is conveyed onto the stationary platen 24, and discharged by the rotation of the discharge roller 25 to the paper rest tray 26.

Figure 6:
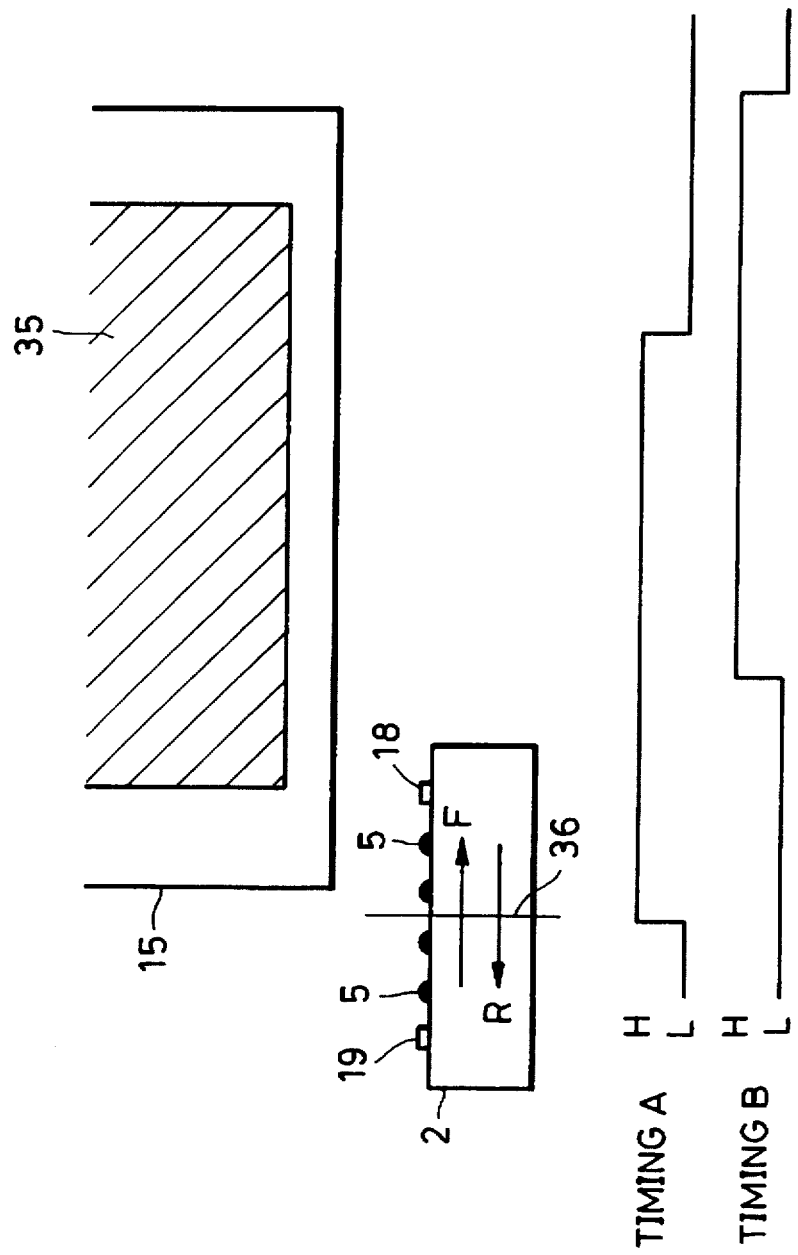
FIG. 6 is a view schematically showing the recording apparatus shown in FIG. 1 for illustrating the operation of the apparatus.

As shown in FIG. 6, the radiation of toning light from the toning light generation sources 18 and 19 is effected at different timings A and B. In each of the representations of the timings A and B, toning light radiation is effected during the period at level H, whereas it is not effected during the period at level L. The timings A and B are different in the position at which the center line 36 substantially equidistant from the toning light sources 18 and 19 corresponds to the start and the termination of a toning light radiation. When the recording head 2 is moving in the direction F, and the toning light source 18 is simultaneously within the recording region 35 of a recording member 15, toning light is radiated from the toning light source 18 in accordance with radiation information (timing A). When the recording head 2 is moving in the direction R, and the other toning light source 19 is simultaneously within the recording region 35, toning light is radiated from the toning light source 19 in accordance with radiation information (timing B). Thus, since the toning light source to effect radiation (either the source 18 or 19) is positioned ahead of the ejection holes 5 regardless of whether the recording head 2 is moving forward or rearward, it is possible to radiate toning light onto a position of the recording region before the current recording takes place on that position (such radiation will hereinafter referred to as "fore-radiation"). Where the recording member is a record previously produced employing a light-tonable recording liquid, the fore-radiation causes the whole or a part of the colored (printed) portions of the record to be toned or erased. A recording liquid may be ejected onto the toned portion of the record from the ejection port positioned behind the pertinent toning light source, thereby effecting over-depositing or re-recording.

When fore-radiation is effected with respect to a part of a record of the above-described kind, partial toning or partial erasure of the record is possible. When partial erasure is followed by re-recording on the same position, it is possible to correct the portion of the record.

Alternatively, the toning light sources 18 and 19 may be positioned in the reverse relationship so that the toning light source to effect radiation (either the source 18 or 19) is positioned behind the ejection holes 5 in the direction of reciprocal movement of the recording head 2. With this relationship, it is possible to radiate toning light onto the whole region or a part of the region which has been subjected to the current recording (hind-radiation).

Figure 7:
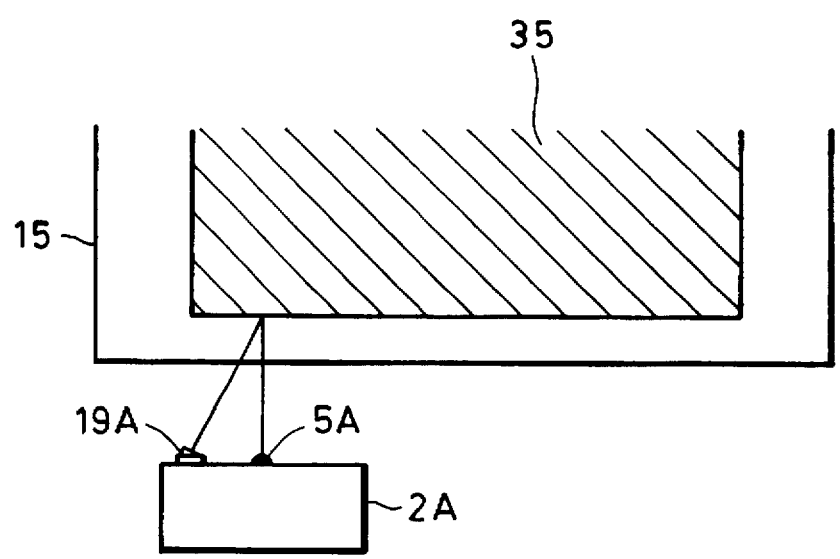
FIG. 7 is a view showing another embodiment of a toning light generating source.

The hind-radiation may be effected by various methods. One of them comprises radiating toning light onto a position of the region which has been relatively moved to confront the toning light source after the current recording had taken place at that position. Another possible method comprises, as shown in FIG. 7, arranging a toning light generating source 19A so positioned as to radiate toning light (such as a laser beam) onto a certain position of the recording region 35 of a recording member 15 to which recording liquid droplets (such as ink droplets) ejected from an ejection hole 5A of a recording head 2A should adhere, and radiating a laser beam onto the pertinent position simultaneous with the adhesion of recording liquid droplets ejected from the recording head 2A. Even when the recording head 2A has a plurality of ejection holes 5A, providing a plurality of toning light generating sources 19A makes it possible to radiate laser beams onto a plurality of such positions simultaneous with adhesion of ink droplets.

Such hind-radiation makes it possible to tone the whole or a part of the colored portions already recorded with a light-tonable recording liquid. If, for example, the recording density is adjusted, various half-tones can be obtained, enabling the production of a multi-value or multi-tone record. If selected colored portions are rendered completely colorless, it is possible to form a base-color image against a colored background (a white image if the base, the surface of the recording member, is white). The extent of toning of the colored portions can be adjusted by varying the intensity of toning light and/or the period of radiation.

In order to adjust the recording density, means for varying the radiation period, the wavelength of toning light, or the intensity of radiation is necessary. For example, a system for controlling the radiation period may adopt a method comprising modulating the pulse width by means of a liquid crystal shutter or the like on the basis of information from the CPU, or a similar method comprising turning on and off the light source itself. A system for controlling the intensity of radiation may adopt a method comprising varying the intensity with which the toning light source generates light, or a method comprising varying the focal length of a collimator, thereby varying illuminance per unit area.

A base-color image may be alternatively formed by introducing a record, already recorded with a light-tonable recording liquid, into the apparatus 1, and effecting only toning by causing at least one of the toning light sources 18 and 19 to radiate toning light in accordance with image information without ejecting recording liquid from the ejection port. The formation of a base-color image may involve an additional arrangement in which a signal from the host computer, etc. is input to the control system when such is instructed through the control panel or a control button. This arrangement may incorporate an instruction system including a reversion button so that the image information used can be reverted to a recording information commanding ejection of recording liquid, thereby enabling an ordinary image formation.

A certain arrangement may be adopted in view of the adjustment of density, etc., in which a signal concerning such adjustment can be input from the host computer, and whether or not the signal is to be received is determined on the basis of the operation of a button on the control panel of the printer.

The above-described fore-radiation and hind-radiation may be simultaneously effected during the scanning of the recording head 2. In this case, an arrangement may be made to enable only fore-radiation or only hind-radiation or both of them to be selected by giving an instruction to the CPU 27 through the switch group 28.

On the other hand, the use of the toning light source 20 makes it possible to reuse a record recorded with a light-tonable recording liquid. The light source 20 may be used, for example, in following manner. An erasure button is provided for commanding an "erasure only" mode in which toning light is radiated from the light source 20 without effecting recording. When the erasure button is operated, a record of the above-described kind is passed through the area irradiated with toning light from the toning light source 20 so that the record is subjected to, for example, all-surface erasing. Thereafter, the record is discharged to the paper rest tray 26. The erasing need not be all-surface erasing, and partial erasing may be effected by limiting the area within which the toning light source 20 radiates toning light. If the apparatus has a mechanism for automatically introducing a discharged recording member from the paper rest tray 26 into the paper feed tray 21, the apparatus can be adapted for effective reuse of a recording member. Further, the erasure employing the toning light source 20 may involve an additional arrangement in which, if a recording member to be processed has a mark printed thereon with a light-tonable recording liquid and indicating that the recording member is a record recorded with a light-tonable recording liquid, a reading means reads such a mark. With this arrangement, erasure by the use of the toning light source 20 can be effected on the basis of automatic determination. If a recording member which has been illuminated by the toning light source 20 is moved onto the platen 4 and subjected to recording by the recording head 2, it is possible to subsequently and continuously perform erasing and recording.

The toning light source 20 may comprise, for example, a laser beam source having a wavelength range including 825 nm, a tungsten halogen lamp, a xenon flash lamp, or a light-emitting diode (LED). When the toning light source 20 is a lamp of approximately 350 W, it can be used at an erasing speed of approximately 10 pages per minute (10 PPM) with respect to A4 size longitudinally-fed paper. Sufficient erasure effect can be obtained with a radiation energy of approximately 0.2 mJ per 1 $cm^2$.

Where the light radiation by the toning light sources 18, 19 and 20 results in heat being generated in or supplied to the illuminated portion of the recording member, the heat may be utilized to promote the fixing of the image on the record. Therefore, a system which radiates light prior to each recording operation by the recording head 2 is advantageous in that it is possible to improve the ability of a record of being fixed even when a recording member which has not been subjected to recording is used.

Since the ability of records to be fixed can be improved according to the present invention, the recording member may include film for overhead projectors (OHPs), having a relatively low ability of absorbing a recording liquid.

Although descriptions have been given concerning a serial printer, it is possible to achieve similar effects when the present invention is applied to a full-line head printer.

Examples of the light-tonable recording liquid which may be used in the present invention include the following:

| <Recording Liquid Composition A> | |
| --- | --- |
| borate of cationic dye (C.I. 42000) | 3 parts |
| tetrabutylammonium butyltriphenyl borate | 2 parts |
| diethylene glycol | 30 parts |
| ethyl alcohol | 5 parts |
| water | 60 parts |
| <Recording Liquid Composition B> | |
| IR820B (dye of formula (I)) | 4 parts |
| tetrabutylammonium butyltriphenyl borate | 1 part |
| diethylene glycol | 30 parts |
| water | 65 parts |
| <Recording Liquid Composition C> | |
| borate of cationic dye (C.I. 52015) | 3 parts |
| tetrabutylammonium butyltriphenyl borate | 0.5 part |
| glycerin | 10 parts |
| diethylene glycol | 10 parts |
| isopropyl alcohol | 3 parts |
| water | 73.5 parts |
| <Recording Liquid Composition D> | |
| borate of cationic dye (C.I. 48020) | 4 parts |
| tetrabutylammonium butyltriphenyl borate | 1 part |
| triethylene glycol | 10 parts |
| 1, 2, 6-hexane triol | 10 parts |
| water | 75 parts |

According to the present invention, since a light-tonable recording liquid capable of being toned by light radiation is employed as a recording liquid for ink-jet recording, colored portions formed with a light-tonable recording liquid can be toned by radiating toning light even after recording. The toning may be adapted to adjust the recording density or the like to create various half-tones, thereby enabling multi-value recording employing light radiation.

The toning may be such that a record obtained by recording with a light-tonable recording liquid is irradiated with toning light so as to erase colored portions. If the record is no longer necessary, it may be subjected to all-surface erasure so that the recording member can be used again. Partial erasure may be effected to correct an error of the record without spoiling its appearance quality.

Further, the generation or supply of heat caused by the radiation of toning light can be utilized to promote the ability of the record of being fixed.

The individual components shown in outline or designated by blocks in the drawings are all well-known in the image recordings arts, and their specific construction and operation are not critical to the operation or best mode for carrying out the invention.

While the present invention has been described with respect to what is currently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method of creating a variety of half-tones using ink-jet recording, comprising the steps of:
providing an irreversibly light-tonable recording liquid with a component having a chemical structure which is permanently altered by an exposure to at least one of visible light and near-infrared light such that an optical property of said liquid is changed;
ejecting the irreversibly light-tonable recording liquid onto a recording member, thereby forming at least one colored portion on the recording member; and
toning by radiating at least one of visible light and near-infrared light onto a desired part of the at least one colored portion, so that said at least one colored portion is irreversibly toned to form a half-tone image.

2. A method according to claim 1, wherein said toning step comprises erasing the desired part.

3. A method according to claim 1, wherein said toning step comprises changing at least one of a hue or a density of the desired part.

4. A method according to claim 1, further comprising the step of providing an information signal, wherein said toning step is effected by varying at least one of an intensity and a period of light radiation in accordance with the information signal.

5. A method according to claim 4, wherein the information signal comprises a half-tone signal.

6. A method according to claim 1, wherein the recording liquid comprises a recording agent having an absorption peak at a wavelength of 700 to 1000 nm, an ammonium salt of organic boron, and a liquid medium.

7. A method according to claim 6, wherein the recording agent comprises a borate of a cationic dye.

8. A method according to claim 6, wherein the ammonium salt of organic boron is contained in the recording liquid in an amount of 1 to 100% of a weight % of the recording agent.

9. A method according to claim 1, wherein in said ejecting step droplets of recording liquid are formed by applying heat energy to the recording liquid.

10. A method of creating a variety of half-tones using ink-jet recording, comprising the steps of:

providing an irreversibly light-tonable recording liquid with a component having a chemical structure which is permanently altered by an exposure to at least one of visible light and near-infrared light such that an optical property of said liquid is changed;

radiating at least one of visible light and near-infrared light onto a desired part of at least one colored portion of an image recorded with the irreversibly light-tonable recording liquid, thereby irreversibly erasing the desired part; and recording again on the erased desired part by ejecting a new quantity of the recording liquid thereon, whereby a half-tone image is formed.

11. A method according to claim 10, wherein the recording liquid comprises a recording agent having an absorption peak at a wavelength of 700 to 1000 nm, and an ammonium salt of organic boron.

12. A method according to claim 11, wherein the recording agent is a borate of a cationic dye.

13. A method according to claim 10, wherein in said recording step droplets of recording liquid are formed by applying heat energy to the recording liquid.

14. An ink-jet recording apparatus for creating a variety of half-tones using, comprising:

a recording head for ejecting, in accordance with recording information, droplets of an irreversibly light-tonable recording liquid for being toned by light radiation, the irreversibly light-tonable recording liquid including a component having a chemical structure which is permanently altered by an exposure to at least one of visible light and near-infrared light such that an optical property of said liquid is changed, thereby forming at least one colored portion on the recording member;

recording head position control means for positioning said recording head at a recording position in accordance with the recording information;

recording member feed means for feeding a recording region of a recording member to the recording position;

recording member removal means for removing the recording member from the recording position; and toning light radiation means for radiating at least one of visible light and near-infrared light for irreversibly toning the light-tonable recording liquid on the recording member, wherein the recording liquid is ejected onto the recording member to form a half-tone image which is at least one of colored and opaque.

15. An apparatus according to claim 14, wherein at least a part of the recording liquid on the recording member is rendered colorless by the radiation of light.

16. An apparatus according to claim 14, wherein said toning light radiation means comprises means for radiating toning light onto a position of the recording region of the recording member which has not yet reached the recording position.

17. An apparatus according to claim 16, further comprising a carriage through which said recording head position control means causes said recording head to scan a surface of the recording member, wherein said toning light radiation means is positioned ahead of a recording liquid ejection port of said recording head in a direction of scanning.

18. An apparatus according to claim 16, wherein said toning light radiation means comprises means for radiating toning light onto a position of the recording region of the recording member which has passed the recording position.

19. An apparatus according to claim 18, further comprising a carriage through which said recording head position control means causes said recording head to scan a surface of the recording member, wherein said toning light radiation means is positioned behind a recording liquid ejection port of said recording head in a direction of scanning.

20. An apparatus according to claim 14, wherein said toning light radiation means comprises means, provided in a passage along which the recording member is fed by said recording member feed means to the recording position, for radiating toning light onto at least a portion of a surface of the recording member.

21. An apparatus according to claim 14, wherein said toning light radiation means comprises means provided at the recording position for radiating toning light onto recording liquid droplets ejected from said recording head and adhered to the recording region of the recording member.

* * * * *

UNITED STATES PATENT AND TRADEMARK OFFICE
CERTIFICATE OF CORRECTION

PATENT NO. :   5,777,639

DATED        :   July 7, 1998

INVENTOR(S):   TETSUTO KAGEYAMA ET AL.

It is certified that error appears in the above-identified patent and that said Letters Patent is hereby corrected as shown below:

<u>COLUMN 11</u>

Line 26, "using" should be deleted.

<u>COLUMN 12</u>

Line 22, "claim 16," should read --claim 14,--.

Signed and Sealed this

Thirty-first Day of August, 1999

Attest:

Q. TODD DICKINSON

*Attesting Officer*     *Acting Commissioner of Patents and Trademarks*